US006854051B2

(12) United States Patent
Mukherjee

(10) Patent No.: US 6,854,051 B2
(45) Date of Patent: Feb. 8, 2005

(54) CYCLE COUNT REPLICATION IN A SIMULTANEOUS AND REDUNDANTLY THREADED PROCESSOR

(75) Inventor: Shubhendu S. Mukherjee, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 09/839,459

(22) Filed: Apr. 19, 2001

(65) Prior Publication Data

US 2001/0037445 A1 Nov. 1, 2001

Related U.S. Application Data

(60) Provisional application No. 60/198,530, filed on Apr. 19, 2000.

(51) Int. Cl.[7] ............................. G06F 9/38; G06F 9/44; G06F 9/54; G06F 11/14

(52) U.S. Cl. ....................... 712/248; 712/219; 712/202; 718/107; 718/108; 719/331; 717/163; 714/6

(58) Field of Search .................................. 712/227, 247, 712/202, 219, 248, 23, 245, 228; 714/11, 6, 20; 719/315, 133, 332; 717/163, 127, 165; 718/107, 108

(56) References Cited

U.S. PATENT DOCUMENTS

| 5,758,142 | A |   | 5/1998  | McFarling et al. ......... 395/586 |
|-----------|---|---|---------|-----------------------------------|
| 5,802,265 | A | * | 9/1998  | Bressoud et al. ............. 714/11 |
| 5,933,860 | A |   | 8/1999  | Emer et al. ................. 711/213 |
| 6,357,016 | B1 | * | 3/2002 | Rodgers et al. ............. 713/601 |
| 6,493,740 | B1 | * | 12/2002 | Lomax ....................... 718/107 |

OTHER PUBLICATIONS

*AR–SMT: Microarchitectural Approach To Fault Tolerance In Microprocessors,* Eric Rotenberg, (8 p.).
*DIVA: A Dynamic Approach To Microprocessor Verification,* Todd M. Austin, Journal of Instruction–Level Parallelism 2 (2000) 1–6, Submitted Feb. 2000; published May 2000 (26 p.).
*DIVA: A Reliable Substrate For Deep Submicron Microarchitecture Design,* Todd M. Austin, May/Jun. 1999 (12 p.).
M. Franklin, "Incorporating Fault Tolerance in Superscalar Processors," Proceedings of High Performance Computing, Dec., 1996.
A. Mahmood et al., "Concurrent Error Detection Using Watchdog Processors—A Survey," IEEE Trans. on Computers, 37(2):160–174, Feb. 1988.
J. H. Patel et al., "Concurrent Error Detection In ALU's by Recomputing With Shifted Operands," IEEE Trans. on Computers, 31(7):589–595, Jul. 1982.
D. A. Reynolds et al., "Fault Detection Capabilities Of Alternating Logic," IEEE Trans. on Computers, 27(12):1093–1098, Dec. 1978.

(List continued on next page.)

*Primary Examiner*—Daniel H. Pan

(57) ABSTRACT

A pipelined, simultaneous and redundantly threaded ("SRT") processor comprising, among other components, load/store units configured to perform load and store operations to or from data locations such as a data cache and data registers and a cycle counter configured to keep a running count of processor clock cycles. The processor is configured to detect transient faults during program execution by executing instructions in at least two redundant copies of a program thread and wherein false errors caused by incorrectly replicating cycle count values in the redundant program threads are avoided by implementing a cycle count queue for storing the actual values fetched by read cycle count instructions in the first program thread. The load/store units then access the cycle count queue and not the cycle counter to fetch cycle count values in response to read cycle count instructions in the second program thread.

21 Claims, 4 Drawing Sheets

OTHER PUBLICATIONS

E. Rotenberg et al., "Trace Cache: A Low Latency Approach To High Bandwidth Instruction Fetching," Proceedings of the 29th Annual International Symposium on Microarchitecture, pp. 24–34, Dec. 1996.

E. Rotenberg et al., "Trace Processors," 30th Annual International Symposium on Microarchitecture (MICRO–30), Dec. 1997.

T. J. Slegel et al., "IBM's S/390 G5 Microprocessor Design," IEEE Micro, pp. 12–23, Mar./Apr. 1999.

J. E. Smith et al., "Implementing Precise Interrupts In Pipelined Processors," IEEE Trans. on Computers, 37(5):562–573, May 1988.

G. S. Sohi et al., "A Study Of Time–Redundant Fault Tolerance Techniques For High–Performance Pipelined Computers," Digest of Papers, 19th International Symposium on Fault–Tolerant Computing, pp. 436–443, 1989.

G. S. Sohi et al., "Instruction Issue Logic For High–Performance, Interruptible, Multiple Functional Unit, Pipelined Computers," IEEE Transactions on Computers, 39(3):349–359, Mar. 1990.

D. M. Tullsen, et al., "Simultaneous Multithreading: Maximizing On–Chip Parallelism," Proceedings of the 22nd Annual International Symposium on Computer Architecture, Italy, Jun. 1995.

D. Tullsen et al., "Exploiting Choice: Instruction Fetch And Issue On An Implementable Simultaneous Multithreading Processor," Proceedings of the 23rd Annual International Symposium on Computer Architecture (ISCA), May, 1996.

S. K. Reinhardt et al., "Transient Fault Detection Via Simultaneous Multithreading" (12 p.).

L. Spainhower et al., "IBM S/390 Parallel Enterprise Server G5 Fault Tolerance: A Historical Perspective," IBM J. Res. Develop. vol. 43, No. 5/6, Sep./Nov. 1999, pp. 863–873.

M. Franklin, "A Study Of Time Redundant Fault Tolerance Techniques For Superscalar Processors" (5 p.).

K. Sundaramoorthy et al., "Slipstream Processors: Improving Both Performance And Fault Tolerance" (6 p.).

* cited by examiner

| CYCLE COUNT QUEUE 150 | | | | |
|---|---|---|---|---|
| PC | CYC. COUNT | | ... | |
| | | | | |

Fig. 6

| RUU 130 | | |
|---|---|---|
| # | INST. | DIN |
| I1 | ADD | |
| I2 | MOV | |
| I3 | CMP | I1 |
| I4 | BR1 | I3 |
| I5 | MUL | |
| I6 | POP | |
| I7 | SUB | |
| I8 | CMP | I7 |

Fig. 5

CYCLE COUNT REPLICATION IN A SIMULTANEOUS AND REDUNDANTLY THREADED PROCESSOR

CROSS-REFERENCE TO RELATED APPLICATIONS

This application is a non-provisional application claiming priority to provisional application Ser. No. 60/198,530, filed on Apr. 19, 2000, entitled "Transient Fault Detection Via Simultaneous Multithreading," the teachings of which are incorporated by reference herein.

This application is further related to the following co-pending applications, each of which is hereby incorporated herein by reference:

U.S. patent application Ser. No. 09/584,034, filed May 30, 2000, now U.S. Pat. No. 6,757,811 and entitled "Slack Fetch to Improve Performance of a Simultaneous and Redundantly Threaded Processor."

U.S. patent application Ser. No. 09/837,995, filed Apr. 19, 2001, and entitled "Simultaneously and Redundantly Threaded Processor Store instruction Comparator."

U.S. patent application Ser. No. 09/839,621, now U.S. Pat. No. 6,598,122, filed Apr. 19, 2001, and entitled "Active Load Address Buffer."

U.S. patent application Ser. No. 09/838,078, filed Apr. 19, 2001, and entitled "Simultaneous and Redundantly Threaded Processor Branch Outcome Queue."

U.S. patent application Ser. No. 09/838,069, filed Apr. 19, 2001, now U.S. Pat. No. 6,792,525 and entitled "Input Replicator for Interrupts in a Simultaneous and Redundantly Threaded Processor."

U.S. patent application Ser. No. 09/839,626, filed Apr. 19, 2001, and entitled "Simultaneously and Redundantly Threaded Processor Uncached Load Address Comparator and Data Value Replication Circuit."

U.S. patent application Ser. No. 09/839,824, filed Apr. 19, 2001 and entitled "Load Value Queue Input Replication in a Simultaneous and Redundantly Threaded Processor."

BACKGROUND OF THE INVENTION

1. Field of the Invention

The present invention generally relates to microprocessors. More particularly, the present invention relates to a pipelined, multithreaded processor that can execute a program in at least two separate, redundant threads. More particularly still, the invention relates to a method and apparatus for ensuring valid replication of reads from a cycle counter to each redundant thread.

2. Background of the Invention

Solid state electronics, such as microprocessors, are susceptible to transient hardware faults. For example, cosmic rays or alpha particles can alter the voltage levels that represent data values in microprocessors, which typically include millions of transistors. Cosmic radiation can change the state of individual transistors causing faulty operation. The frequency of such transient faults is relatively low— typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient fault due to their smaller anticipated size, reduced voltage levels, higher transistor count, and reduced noise margins. Accordingly, even low-end personal computers may benefit from being able to protect against such faults.

One way to protect solid state electronics from faults resulting from cosmic radiation is to surround the potentially effected electronics by a sufficient amount of concrete. It has been calculated that the energy flux of the cosmic rays can be reduced to acceptable levels with six feet or more of concrete surrounding the computer containing the chips to be protected. For obvious reasons, protecting electronics from faults caused by cosmic ray with six feet of concrete usually is not feasible. Further, computers usually are placed in buildings that have already been constructed without this amount of concrete.

Rather than attempting to create an impenetrable barrier through which cosmic rays cannot pierce, it is generally more economically feasible and otherwise more desirable to provide the affected electronics with a way to detect and recover from a fault caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition. One technique, such as that implemented in the Compaq Himalaya system, includes two identical "lockstepped" microprocessors. Lockstepped processors have their clock cycles synchronized and both processors are provided with identical inputs (i.e., the same instructions to execute, the same data, etc.). A checker circuit compares the processors' data output which may also include memory addressed for store instructions). The output data from the two processors should be identical because the processors are processing the same data using the same instructions, unless of course a fault exists. If an output data mismatch occurs, the checker circuit flags an error and initiates a software or hardware recovery sequence. Thus, if one processor has been affected by a transient fault, its output likely will differ from that of the other synchronized processor. Although lockstepped processors are generally satisfactory for creating a fault tolerant environment, implementing fault tolerance with two processors takes up valuable real estate.

A "pipelined" processor includes a series of functional units (e.g., fetch unit, decode unit, execution units, etc.), arranged so that several units can be simultaneously processing an appropriate part of several instructions. Thus, while one instruction is being decoded, an earlier fetched instruction can be executed. A "simultaneous multithreaded" ("SMT") processor permits instructions from two or more different program threads (e.g., applications) to be processed through the processor simultaneously. An "out-of-order" processor permits instructions to be processed in an order that is different than the order in which the instructions are provided in the program (referred to as "program order"). Out-of-order processing potentially increases the throughput efficiency of the processor. Accordingly, an SMT processor can process two programs simultaneously.

An SMT processor can be modified so that the same program is simultaneously executed in two separate threads to provide fault tolerance within a single processor. Such a processor is called a simultaneous and redundantly threaded ("SRT") processor. Some of the modifications to turn a SMT processor into an SRT processor are described in Provisional Application Ser. No. 60/198,530.

Executing the same program in two different threads permits the processor to detect faults such as may be caused by cosmic radiation, noted above. By comparing the output data from the two threads at appropriate times and locations within the SRT processor, it is possible to detect whether a fault has occurred. For example, data written to cache memory or registers that should be identical from corresponding instructions in the two threads can be compared. If the output data matches, there is no fault. Alternatively, if there is a mismatch in the output data, a fault has presumably occurred in one or both of the threads.

Executing the same program in two separate threads advantageously affords the SRT processor some degree of fault tolerance, but also may cause several performance problems. For instance, any latency caused by a cache miss is exacerbated. Cache misses occur when an instruction requests data from memory that is not also available in cache memory. The processor first checks whether the requested data already resides in the faster access cache memory, which generally is onboard the processor die. If the requested data is not present in cache (a condition referred to as a cache "miss"), then the processor is forced to retrieve the data from main system memory which takes more time, thereby causing latency, than if the data could have been retrieved from the faster onboard cache. Because the two threads are executing the same instructions, any instruction in one thread that results in a cache miss will also experience the same cache miss when that same instruction is executed in other thread. That is, the cache latency will be present in both threads.

A second performance problem concerns branch misspeculation. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the branch instruction is fetched by the fetch unit in the processor. In order to keep the pipeline full (which is desirable for efficient operation), a pipelined processor includes branch prediction logic which predicts the outcome of a branch instruction before it is actually executed (also referred to as "speculating"). Branch prediction logic generally bases its speculation on short or long term history. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the branch instruction is executed by the processor, then the next instructions to be executed have already been fetched and are working their way through the pipeline.

If, however, the branch speculation turns out to have been the wrong prediction (referred to as "misspeculation"), many or all of the instructions filling the pipeline behind the branch instruction may have to be thrown out (i.e., not executed) because they are not the correct instructions to be executed after the branch instruction. The result is a substantial performance hit as the fetch unit must fetch the correct instructions to be processed through the pipeline. Suitable branch prediction methods, however, result in correct speculations more often than misspeculations and the overall performance of the processor is improved with a suitable branch predictor (even in the face of some misspeculations) than if no speculation was available at all.

In an SRT processor that executes the same program in two different threads for fault tolerance, any branch misspeculation is exacerbated because both threads will experience the same misspeculation. Because the branch misspeculation occurs in both threads, the processor's internal resources usable to each thread are wasted while the wrong instructions are replaced with the correct instructions.

In an SRT processor, threads may be separated by a predetermined amount of slack to improve performance. In this scenario, one thread is processed ahead of the other thread thereby creating a "slack" of instructions between the two threads so that the instructions in one thread are processed through the processor's pipeline ahead of the corresponding instructions from the other thread. The thread whose instructions are processed earlier is called the "leading" thread, while the other thread is the "trailing" thread. By setting the amount of slack (in terms of numbers of instructions) appropriately, all or at least some of the cache misses or branch misspeculations encountered by the leading thread can be resolved before the corresponding instructions from the trailing thread are fetched and processed through the pipeline.

In an SRT processor, the processor verifies that inputs to the multiple threads are identical to guarantee that both execution copies or threads follow precisely the same path. Thus, corresponding operations that input data from other locations within the system (e.g., memory, cycle counter), must return the same data values to both redundant threads. Otherwise, the threads may follow divergent execution paths, leading to different outputs that will be detected and handled as if a hardware fault occurred.

One potential problem in running two separate, but redundant threads in a computer processor arises in reading the current value in the system cycle counter. A cycle counter is a running counter that advances once for each tick of the processor clock. Thus, for a 1 GHz processor, the counter will advance once every nanosecond. A conventional cycle counter may be a 64-bit counter that counts up from zero to the maximum value and wraps around to zero to continue counting.

A program that is running on the processor may periodically request the current value of the cycle counter using a read or fetch command. For example, Compaq Alpha servers execute an "rpcc" command that is included in the instruction set for Alpha processors. By reading the cycle counter at the start and finish of an instruction or set of instructions, the processor may calculate how many clock cycles (and therefore, how much time) elapsed during execution of the instructions. Thus, the "read cycle counter" command provides a means of measuring system performance.

As discussed above, corresponding instructions in redundant threads are not executed at precisely the same time. Thus, it should be expected that corresponding read cycle count commands from the different threads will always return different values because some amount of time will elapse between the cycle count retrievals. While this cycle count variation between threads may be expected, the different values may result in a fault condition because the inputs to the two threads are different. It is desirable therefore, to develop a method of replicating the cycle count values from the cycle counter for each redundant thread in the pipeline. By replicating the cycle counter value, erroneous transient fault conditions or faulty SRT operation resulting from the trailing "read cycle count" instructions are avoided.

BRIEF SUMMARY OF THE INVENTION

The problems noted above are solved in large part by a simultaneous and redundantly threaded processor that can simultaneously execute the same program in two separate threads to provide fault tolerance. By simultaneously executing the same program twice, the system can be made fault tolerant by checking the output data pertaining to corresponding instructions in the threads to ensure that the data matches. A data mismatch indicates a fault in the processor effecting one or both of the threads. The preferred embodiment of the invention provides an increase in performance to such a fault tolerant, simultaneous and redundantly threaded processor.

The preferred embodiment includes a pipelined, simultaneous and redundantly threaded ("SRT") processor, comprising a program counter configured to assign program count identifiers to instructions in each thread, a register update unit configured to store a queue of instructions prior to execution by the processor, load/store units configured to perform load and store operations to or from data locations such as a data cache and data registers, and a cycle counter configured to keep a running count of processor clock cycles. The processor is configured to detect transient faults during program execution by executing instructions in at least two redundant copies of a program thread. False errors caused by incorrectly replicating cycle count values in the redundant program threads are avoided by using the actual values from cycle count reads in a first program thread for the second program thread. The SRT processor is an out-of-order processor capable of executing instructions in the most efficient order, but read cycle count ("RCC") instructions are executed in the same order in both the first and second program threads. The register update unit is capable of managing program order for the RCC instructions by establishing a dependence with instructions before and after the RCC instructions in the register update unit.

The SRT processor further comprises a cycle count queue for storing the actual values fetched by RCC instructions in the first program thread. The load/store units place a duplicate copy of the cycle count value in the cycle count queue after fetching the cycle count value from the cycle counter. The load/store units then access the cycle count queue, and not the cycle counter, to fetch cycle count values in response to corresponding RCC instructions in the second program thread. The cycle count queue is preferably a FIFO buffer and individual cycle count entries stored in the cycle count queue comprise: a program count assigned to the RCC instruction by the program counter and a cycle count value that was returned by the corresponding RCC instruction in the leading thread. If the cycle count queue becomes full, the first thread is stalled to prevent more cycle count values from entering the cycle count queue. Conversely, if the cycle count queue becomes empty, the second thread may be stalled to allow cycle count values to enter the cycle count queue.

An alternative embodiment exists for use in systems that do not have access to a cycle count queue. In this embodiment, the processor executes the redundant threads with some predetermined amount of slack between the threads. Upon encountering an RCC command in the leading thread, the leading thread is halted and the trailing thread is executed until the corresponding RCC command is reached in the trailing thread. Once synchronized, the load/store units fetch the current cycle count value from the cycle counter and distributes this value to both threads. The alternative embodiment permits implementation in existing computer systems.

BRIEF DESCRIPTION OF THE DRAWINGS

For a detailed description of the preferred embodiments of the invention, reference will now be made to the accompanying drawings in which:

FIG. 5 is a diagram of a Register Update Unit in accordance with a preferred embodiment; and FIG. 6 is a diagram of a Cycle Count Queue in accordance with a preferred embodiment.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
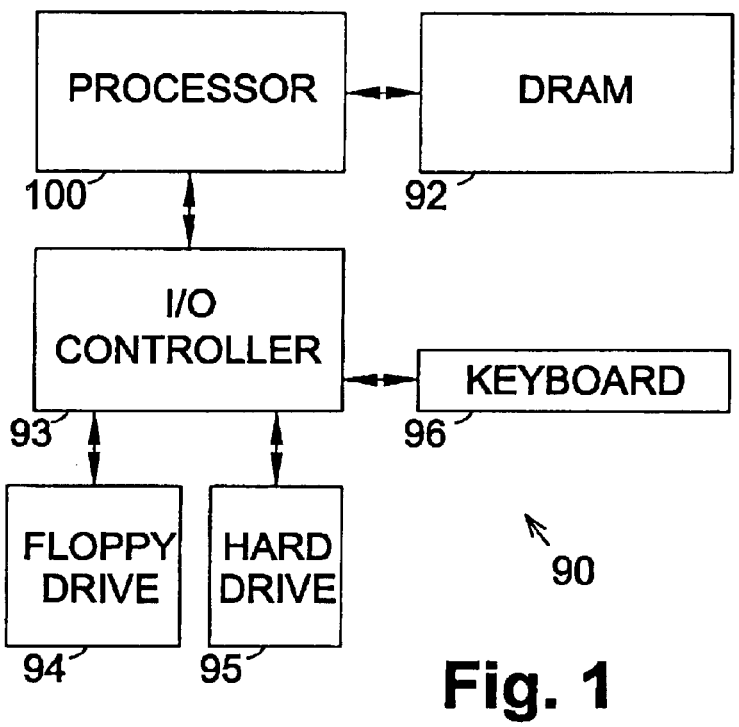
FIG. 1 is a diagram of a computer system constructed in accordance with the preferred embodiment of the invention and including a simultaneous and redundantly threaded processor.

FIG. 1 shows a computer system 90 including a pipelined, simultaneous and redundantly threaded ("SRT") processor 100 constructed in accordance with the preferred embodiment of the invention. In addition to processor 100, computer system 90 also includes dynamic random access memory ("DRAM") 92, an input/output ("I/O") controller 93, and various I/O devices which may include a floppy drive 94, a hard drive 95, a keyboard 96, and the like. The I/O controller 93 provides an interface between processor 100 and the various I/O devices 94–96. The DRAM 92 can be any suitable type of memory devices such as RAMBUS™ memory. In addition, SRT processor 100 may also be coupled to other SRT processors if desired in a commonly known "Manhattan" grid, or other suitable architecture.

The preferred embodiment of the invention ensures correct operation and provides a performance enhancement to SRT processors. The preferred SRT processor 100 described above is capable of processing instructions from two different threads simultaneously. Such a processor in fact can be made to execute the same program as two different threads. In other words, the two threads contain the same program set. Processing the same program through the processor in two different threads permits the processor to detect faults caused by cosmic radiation or alpha particles as noted above.

Figure 2:
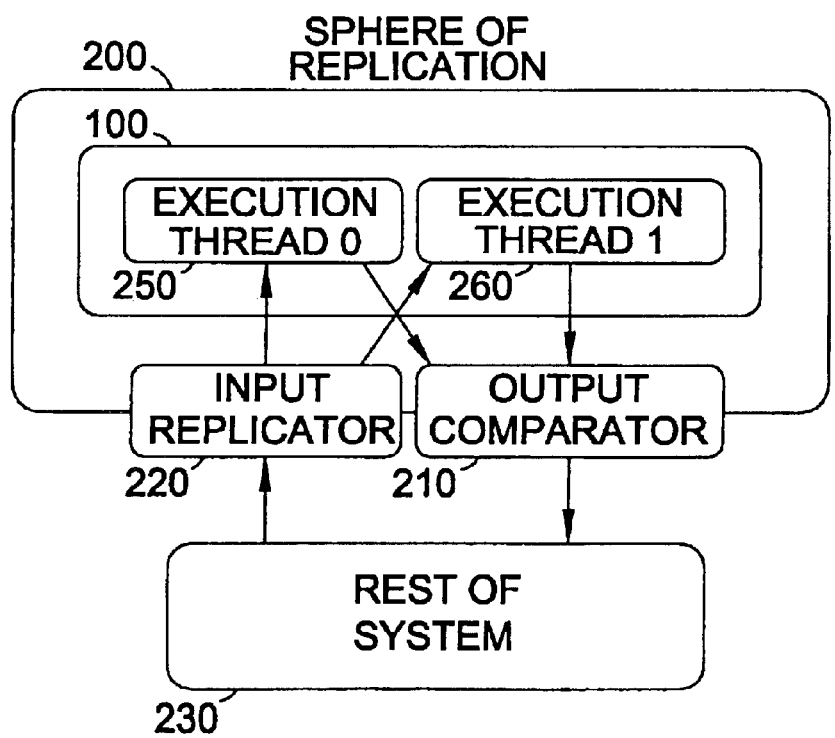
FIG. 2 is a graphical depiction of the input replication and output comparison executed by the simultaneous and redundantly threaded processor according to the preferred embodiment.

FIG. 2 conceptually shows the simultaneous and redundant execution of threads 250, 260 in the processor 100. The threads 250, 260 are referred to as Thread 0 ("T0") and Thread 1 ("T1"). In accordance with the preferred embodiment, the processor 100 or a significant portion thereof resides in a sphere of replication 200, which defines the boundary within which all activity and states are replicated either logically or physically. Values that cross the boundary of the sphere of replication are the outputs and inputs that require comparison 210 and replication 220, respectively. Thus, a sphere of replication 200 that includes fewer components may require fewer replications but may also require more output comparisons because more information crosses the boundary of the sphere of replication. The preferred sphere of replication is described in conjunction with the discussion of FIG. 4 below.

All inputs to the sphere of replication 200 must be replicated 220. For instance, an input resulting from a memory load command must return the same value to each execution thread 250, 260. If two distinctly different values are returned, the threads 250, 260 may follow divergent execution paths. Similarly, the outputs of both threads 250, 260 must be compared 210 before the values contained therein are shared with the rest of the system 230. For instance, each thread may need to write data to memory 92 or send a command to the I/O controller 93. If the outputs from the threads 250, 260 are identical, then it is assumed that no transient faults have occurred and a single output is forwarded to the appropriate destination and thread execution continues. Conversely, if the outputs do not match, then appropriate error recovery techniques may be implemented to re-execute and re-verify the "faulty" threads.

It should be noted that the rest of the system 230, which may include such components as memory 92, I/O devices 93–96, and the operating system need not be aware that two threads of each program are executed by the processor 100. In fact, the preferred embodiment generally assumes that all input and output values or commands are transmitted as if only a single thread exists. It is only within the sphere of replication 200 that the input or output data is replicated.

Figure 3:
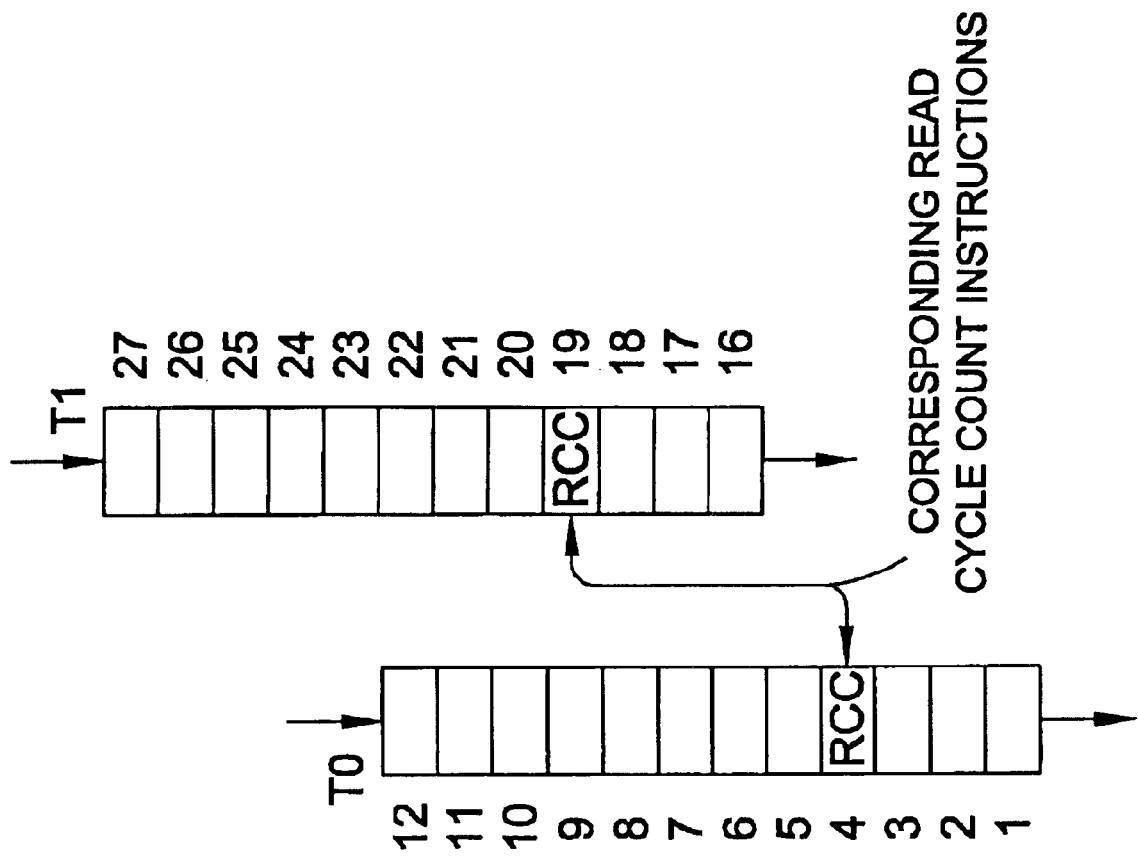
FIG. 3 conceptually illustrates the problem encountered by the multithreaded processor of FIGS. 1 and 2 when corresponding cycle count read commands are issued at different cycle count values.

Among the inputs that must be replicated for distribution to the execution threads 250, 260 are cycle counter values that are periodically requested by computer programs. FIG. 3 illustratively shows the problem with running two separate threads with corresponding "read cycle count" ("RCC") instructions. FIG. 3 shows two distinct, but replicated copies of a program thread T0 & T1 presumably executed in the same pipeline. Thread T0 is arbitrarily designated as the "leading" thread while thread T1 is designated as the "trailing" thread. The threads may be separated in time by a predetermined slack and may also be executed out of program order. In the example shown in FIG. 3, an RCC command is issued in the leading thread T0 that returns a cycle count value of "4". Because of the time delay between execution threads, the corresponding RCC command in trailing thread T1 is not issued until clock cycle "19". While this condition is perfectly normal and expected, the unequal inputs unfortunately yield a fault condition because the inputs to the sphere of replication 200 are not identical. This condition may be rectified by implementing the SRT processor 100 shown in FIG. 4.

Figure 4:
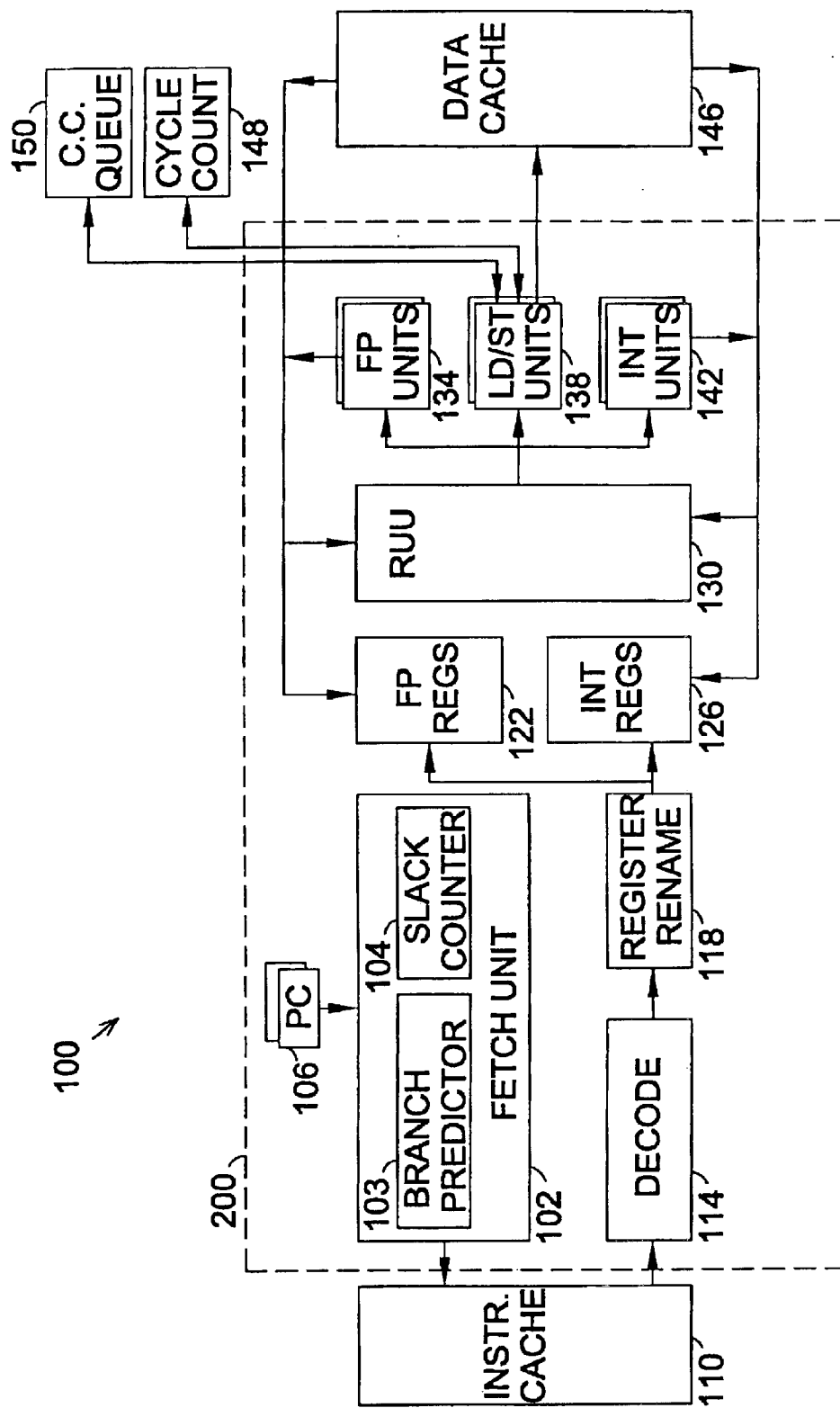
FIG. 4 is a block diagram of the simultaneous and redundantly threaded processor from FIG. 1 in accordance with the preferred embodiment that includes a single cycle counter and a cycle count queue.

Referring to FIG. 4, processor 100 preferably comprises a pipelined architecture which includes a series of functional units, arranged so that several units can be simultaneously processing appropriate parts of several instructions. As shown, the exemplary embodiment of processor 100 includes a fetch unit 102, one or more program counters 106, an instruction cache 110, decode logic 114, register rename logic 118, floating point and integer registers 122, 126, a register update unit 130, execution units 134, 138, and 142, a data cache 146, a cycle counter 148 and a cycle count queue 150.

Fetch unit 102 uses a program counter 106 for assistance as to which instruction to fetch. Being a multithreaded processor, the fetch unit 102 preferably can simultaneously fetch instructions from multiple threads. A separate program counter 106 is associated with each thread. Each program counter 106 is a register that contains the address of the next instruction to be fetched from the corresponding thread by the fetch unit 102. FIG. 4 shows two program counters 106 to permit the simultaneous fetching of instructions from two threads. It should be recognized, however, that additional program counters can be provided to fetch instructions from more than two threads simultaneously.

As shown, fetch unit 102 includes branch prediction logic 103 and a "slack" counter 104. Slack counter 104 is used to create a delay of a desired number of instructions between the threads that include the same instruction set. The introduction of slack permits the leading thread T0 to resolve all or most branch misspeculations and cache misses so that the corresponding instructions in the trailing thread T1 will not experience the same latency problems. The branch prediction logic 103 permits the fetch unit 102 to speculate ahead on branch instructions as noted above. In order to keep the pipeline full (which is desirable for efficient operation), the branch predictor logic 103 speculates the outcome of a branch instruction before the branch instruction is actually executed. Branch predictor 103 generally bases its speculation on previous instructions. Any suitable speculation algorithm can be used in branch predictor 103.

Referring still to FIG. 4, instruction cache 110 provides a temporary storage buffer for the instructions to be executed. Decode logic 114 retrieves the instructions from instruction cache 110 and determines the instruction type (e.g., add, subtract, load, store, etc.). Decoded instructions are then passed to the register rename logic 118 which maps logical registers onto a pool of physical registers.

The register update unit ("RUU") 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 4).

The RUU 130 also handles out-of-order execution management. As instructions are placed in the RUU 130, any dependence between instructions (e.g., one instruction depends on the output from another or because branch instructions must be executed in program order) is maintained by placing appropriate dependent instruction numbers in a field associated with each entry in the RUU 130. FIG. 5 provides a simplified representation of the various fields that exist for each entry in the RUU 130. Each instruction in the RUU 130 includes an instruction number, the instruction to be performed, and a dependent instruction number ("DIN") field. As instructions are executed by the execution units 134, 138, 142, dependency between instructions can be maintained by first checking the DIN field for instructions in the RUU 130. For example, FIG. 5 shows 8 instructions numbered I1 through I8 in the representative RUU 130. Instruction I3 includes the value I1 in the DIN field which implies that the execution of I3 depends on the outcome of I1. Thus, execution units 134, 138, 142 recognize that instruction number I1 must be executed before instruction I3. Therefore, in the example shown in FIG. 5, the same dependency exists between instructions I4 and I3 as well as I8 and I7. Meanwhile, independent instructions (i.e., those with no number in the dependent instruction number field) may be executed out of order.

Referring still to FIG. 4, the floating point register 122 and integer register 126 are used for the execution of instructions that require the use of such registers as is known by those of ordinary skill in the art. These registers 122, 126 can be loaded with data from the data cache 146. The registers also provide their contents to the RUU 130.

As shown, the execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instruction while the integer execution units 142 execute integer-based instructions. The load/store units 138 perform load operations in which data from memory is loaded into a register 122 or 126. The load/store units 138 also perform store operations in which data from registers 122, 126 is written to data cache 146 and/or DRAM memory 92 (FIG. 1). The load/store units 138 also read the cycle counter 148 in response to read cycle count ("RCC") commands as they are encountered in a program thread. The function of the cycle count queue 150 is discussed in further detail below.

The architecture and components described herein are typical of microprocessors, and particularly pipelined, multithreaded processors. Numerous modifications can be made from that shown in FIG. 4. For example, the locations of the RUU 130 and registers 122, 126 can be reversed if desired. For additional information, the following references, all at which are incorporated herein by reference, may be consulted for additional information if needed: U.S. patent application Ser. No. 08/775,553, now U.S. Pat. No. 6,073,159, filed Dec. 31, 1996, and "Exploiting Choice: Instruction Fetch and Issue on an Implementable Simultaneous Multithreaded Processor,"D. Tulisen, S. Eggers, J. Emer, H. Levy, J. Lo and R. Stamm, Proceedings of the 23$^{rd}$ Annual International Symposium on Computer Architecture, Philadelphia, Pa. May 1996.

According to the preferred embodiment, the sphere of replication is represented by the dashed box shown in FIG. 4. The majority of the pipelined processor components are included in the sphere of replication 200 with the notable exception of the instruction cache 110 and the data cache 146. The floating point and integer registers 122, 126 may alternatively reside outside of the sphere of replication 200, but for purposes of this discussion, they will remain as shown. The cycle counter clock 148 also resides outside of the sphere of replication and therefore, any reads from the cycle counter clock 148 must be replicated for the duplicate threads. Note also that the cycle count queue 150 resides outside the sphere of replication as well. Thus, all information that is transmitted between the sphere of replication 200 and the cycle count queue 150 must be protected with some type of error detection, such as parity or error checking and correcting ("ECC"). Parity is an error detection method that is well-known to those skilled in the art. ECC goes one step further and provides a means of correcting errors. ECC uses extra bits to store an encrypted code with the data. When the data is written to a source location, the ECC code is simultaneously stored. Upon being read back, the stored ECC code is compared to the ECC code generated when the data was read. If the codes don't match, they are decrypted to determine which bit in the data is incorrect. The erroneous bit may then be flipped to correct the data.

The preferred embodiment provides an effective means of replicating cycle counter values returned from an RCC command in the leading thread T0 and delivering a "copy" to the trailing thread T1. Upon encountering an RCC command in the leading thread T0, the load/store units 138 load the current cycle count value from the cycle counter 148 as a conventional processor would. However, in addition, the preferred embodiment of the load/store units 138 loads the same cycle count value into the cycle count queue 150. The cycle count queue 150 is preferably a FIFO buffer that stores the cycle count values until the corresponding RCC commands are encountered in the trailing thread T1. The cycle count queue 150 preferably includes, at a minimum, the fields shown in FIG. 6. Entries in the representative cycle count queue 150 shown in FIG. 6 include an optional program count value and the cycle count value. The program count is used to properly identify the RCC instructions in the queue and the cycle count value is the value that was retrieved by the leading thread T0 when the RCC command was issued. The program count value field is optional because the FIFO buffer guarantees that cycle count values are retrieved by the trailing thread in the correct order. When an RCC command is issued in the trailing thread T1, the load/store units 138 read the cycle count value from the cycle count queue 150 (and not the cycle counter 148). Since the buffer delivers the oldest cycle count values in the stack, and assuming the RCC commands are encountered in program order in the trailing thread, the same cycle count values are returned to each thread. The cycle count values are, therefore, properly replicated and erroneous faults are not generated. The assumed program order is maintained by creating appropriate dependencies in the RUU 130 (as discussed above) between the RCC commands and instructions immediately before or after the RCC command.

In order to prevent buffer overflow, it may be necessary to stall the leading thread T0 to permit the trailing thread T1 to access the cycle count queue 150 and therefore clear entries from the buffer. Similarly, if the queue becomes empty, it may be necessary, though unlikely, to stall the trailing thread T1 to allow cycle count values to enter the cycle count queue 150 before the trailing thread T1 accesses the queue.

In the event a cycle count queue 150 is unavailable or otherwise undesirable, an alternative embodiment exists whereby the leading thread T0 is stalled when an RCC command is encountered in the leading thread T0. In this alternative embodiment, the SRT processor 100 still comprises load/store units 138 and cycle counter 148, but the cycle count queue 150 is unnecessary. As the load/store units 138 encounter an RCC command in the leading thread, the execution of that command and all subsequent commands in the T0 thread is temporarily halted. SRT processor 100 fetches, executes, and retires instructions exclusively in the trailing thread T1 until the corresponding RCC command is encountered. At this point, the load/store units 138 will then execute the RCC command and return the cycle count value to both threads T0 and T1. It should be noted that if the SRT processor 100 is implementing slack fetch as described above, this feature must be temporarily disabled to permit synchronization of the threads. Naturally, disabling the slack fetch feature will temporarily eliminate some of the advantages mentioned above, but this alternative embodiment permits implementation in older legacy systems that do not include a FIFO buffer that may be used as a cycle count queue 150. While this alternative embodiment is the less preferred of the two embodiments presented, it does permit implementation of transient fault detection in an existing computer system.

Accordingly, the preferred embodiment of the invention provides a method of replicating cycle counter values in an SRT processor that can execute the same instruction set in two different threads. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a pipelined, simultaneous and redundantly threaded ("SRT") processor;
   a main system memory coupled to said processor; and
   a cycle counter configured to count clock cycles and advances once for each cycle of the processor clock;
   wherein said SRT processor processes a set of instructions in a leading thread end also in a redundant trailing thread to detect transient faults in the computer system; and
   wherein when a read cycle count command appears in the leading thread, the processor loads the current value of the cycle counter and replicates the value for the corresponding read cycle count command in the trailing thread.

2. The computer system of claim 1 further comprising a cycle count queue;
   wherein when the processor loads the current value of the cycle counter, the processor stores the same value in a cycle count queue.

3. A computer system, comprising:
   a pipelined, simultaneous and redundantly threaded ("SRT") processor;
   a main system memory coupled to said processor;
   a cycle counter configured to count clock cycles and advances once for each cycle of the processor clock; and
   a cycle count queue;
   wherein said SRT processor processes a set of instructions in a leading thread and also in a redundant trailing thread to detect transient faults in the computer system; and
   wherein when a read cycle count command appears in the leading thread, the processor loads the current value of the cycle counter and stores the same value in the cycle count queue;
   wherein the processor accesses the cycle count queue and not the cycle counter to load cycle count values in response to read cycle count instructions in the trailing thread.

4. A computer system, comprising:
   a pipelined, simultaneous and redundantly threaded ("SRT") processor;
   a main system memory coupled to said processor;
   a cycle counter configured to count clock cycles and advances once for each cycle of the processor clock; and
   a cycle count queue being a FIFO buffer;
   wherein said SRT processor processes a set of instructions in a leading thread and also in a redundant trailing thread to detect transient faults in the computer system; and
   wherein when a read cycle count command appears in the leading thread, the processor loads the current value of the cycle counter and stores the same value in the cycle count queue.

5. The computer system of claim 4 wherein all read cycle count commands in the leading and trailing threads are executed by the processor in their original, program order.

6. The computer system of claim 5 wherein if the cycle count queue becomes full, execution of instructions in the leading thread is temporary halted to prevent more cycle count values from entering the cycle count queue; and
   wherein if the cycle count queue becomes empty, execution of instructions in the second thread is temporary halted to allow more cycle count values to enter the cycle count queue.

7. A computer system, comprising:
   a pipelined, simultaneous and redundantly threaded ("SRT") processor;
   a main system memory coupled to said processor;
   a cycle counter configured to count clock cycles and advances once for each cycle of the processor clock; and
   a cycle count queue;
   wherein said SRT processor processes a set of instructions in a leading thread and also in a redundant trailing thread to detect transient faults in the computer system; and
   wherein when a read cycle court command appears in the leading thread, the processor loads the current value of the cycle counter and stores the same value in the cycle court queue;
   wherein the cycle count entries in the cycle count queue comprise a program count identifier and the cycle count value that was retrieved by the processor in response to the corresponding read cycle count command in the leading thread.

8. A pipelined, simultaneous and redundantly threaded ("SRT") processor, comprising:
   a program counter configured to assign program count identifiers to instructions in each thread that are fetched by the processor;
   a register update unit configured to store a queue of instructions prior to execution by the processor;
   floating point execution units configured to execute floating point instructions;
   integer execution units configured to execute integer-based instructions;
   load/store units configured to perform load and store operations to or from data locations such as a data cache and data registers; and
   a cycle counter configured to keep a running count of processor clock cycles;
   wherein said processor is configured to detect transient faults during program execution by executing instructions in at least two redundant copies of a program thread and wherein false errors caused by incorrectly replicating, cycle count values in the redundant program threads are avoided by using the actual values from cycle count reads in a first program thread for a second program thread.

9. The SRT processor of claim 8 wherein the processor further comprises:
   a cycle count queue for storing the actual values fetched by read cycle count instructions in the first program thread;

wherein the load/store units place a duplicate copy of the cycle count value in the cycle count queue after fetching the cycle count value from the cycle counter.

10. The SRT processor of claim 9 wherein the load/store units access the cycle count queue and not the cycle counter to fetch cycle count values in response to read cycle count instruction in the second program thread.

11. The SRT processor of claim 10 wherein the SRT processor is an out-of-order processor capable of executing instructions in the most efficient order, but wherein read cycle count instructions are executed in the same order in both the first and second program threads.

12. The SRT processor of claim 11 wherein the cycle count queue is a FIFO buffer and data is transmitted to and from the buffer using an error correction technique.

13. The SRT processor of claim 12 wherein the individual cycle count values stored in the cycle count queue comprise:
a cycle count value that was returned by the corresponding read cycle count instruction in the leading thread.

14. The SRT processor of claim 12 wherein if the cycle count queue becomes full, the first thread is stalled to prevent more cycle count values from entering the cycle count queue; and
wherein if the cycle count queue becomes empty, the second thread is stalled to allow cycle count values to enter the cycle count queue.

15. The SRT processor of claim 11 wherein the register update unit is capable of managing program order for the read cycle count instructions by establishing a dependence with instructions before end after the read cycle count instructions.

16. A method of replicating cycle counter values in an SRT processor which can fetch and execute a set of instructions in two separate threads so that each thread includes substantially the same instructions as the other thread, one of said threads being a leading thread and the other of said threads being a trailing thread, the method comprising:
probing the cycle counter to fetch the current value of the cycle counter when the leading thread requests the cycle count;
storing the current value in a cycle counter queue;
probing the cycle counter queue for the cycle count value for corresponding cycle count requests in the trailing thread;
executing the cycle count requests in the leading and trailing threads in program order;
wherein the entries in the cycle count queue comprise a program count identifier and the cycle count value.

17. The method of claim 16 further comprising implementing a FIFO buffer as the cycle count queue.

18. The method of claim 17 wherein:
if the buffer becomes full, the leading thread is stalled to prevent more cycle counts from entering the buffer; and
wherein if the buffer becomes empty, the trailing thread is stalled to allow more cycle counts to enter the buffer.

19. The method of claim 16 further comprising:
transmitting data to and from the cycle count queue using an error correction technique.

20. A method of replicating cycle counter values in an SRT processor which can fetch and execute a set of instructions in two separate threads so that each thread includes substantially the same instructions as the other thread, one of said threads being a leading thread and the other of said threads being a trailing thread, the method comprising:
stalling execution of the leading thread when a read cycle count ("RCC") command is encountered in the leading thread;
executing instructions in the trailing thread until the corresponding RCC command is encountered in the leading thread; and
fetching a single copy of the cycle count value from the cycle counter and distributing said value to both threads.

21. The method of claim 20 further comprising:
maintaining a predetermined slack between execution of the leading and trailing threads during normal operation;
temporarily permitting the reduction of the predetermined slack to allow synchronization of the threads; and
resuming the predetermined slack after the RCC command is executed.

* * * * *

UNITED STATES PATENT AND TRADEMARK OFFICE
CERTIFICATE OF CORRECTION

PATENT NO. : 6,854,051 B2  Page 1 of 1
APPLICATION NO. : 09/839459
DATED : February 8, 2005
INVENTOR(S) : Shubhendu S. Mukherjee It is certified that error appears in the above-identified patent and that said Letters Patent is hereby corrected as shown below:

IN THE SPECIFICATION

Column 1, line 38, delete "Ser. No. 09/839,824" and insert therefor --Ser. No. 09/839,624--

IN THE CLAIMS

Claim 15, Column 13, line 30, delete "end" and insert therefor --and--

Signed and Sealed this

Twentieth Day of May, 2008

JON W. DUDAS
*Director of the United States Patent and Trademark Office*